United States Patent [19]
Grossman

[11] 3,748,383
[45] July 24, 1973

[54] CAMERA SYSTEM FOR DAY AND NIGHT USE

[76] Inventor: Robert Grossman, P.O. Box 24649, Los Angeles, Calif. 90024

[22] Filed: Apr. 5, 1971

[21] Appl. No.: 131,109

[52] U.S. Cl. ............................. 178/7.2, 178/DIG. 8
[51] Int. Cl. ............................................... H04n 5/30
[58] Field of Search ...................... 178/7.2, DIG. 29, 178/DIG. 8, 6.8; 250/83 H, 83 HP

[56] References Cited
UNITED STATES PATENTS

| | | | |
|---|---|---|---|
| 2,816,954 | 12/1957 | Huffman | 178/DIG. 8 |
| 3,567,854 | 3/1971 | Tschante et al. | 178/DIG. 5 |
| 3,555,181 | 1/1971 | Thommen | 178/7.2 |
| 2,920,137 | 1/1960 | Garbuny | 178/DIG. 8 |
| 3,629,499 | 12/1971 | Carlson | 250/83.3 HP |

*Primary Examiner*—Richard Murray
*Attorney*—Spensley, Horn and Lubitz

[57] ABSTRACT

A camera system for day and night use whereby a picture of good quality and contrast may be obtained with lighting ranging from full sunlight to complete darkness without manual adjustment of the camera. The camera is made sensitive to infrared light and the field of view of the camera is illuminated with infrared light in response to the intensity of the light being received by the camera from its field of view, and particularly from the darkest areas of its field of view. For a film camera, an infrared image converter is generally used to convert the infrared image to a visual image. In a television camera system, the camera tube may be responsive to infrared light, or an image converter tube may be used. Embodiments of television systems are disclosed wherein a plurality of control loops are used so as to control both brightness and contrast in the picture, such as a control loop to control the voltage on the image converter tube, and another loop to control the voltage on the camera tube.

22 Claims, 6 Drawing Figures

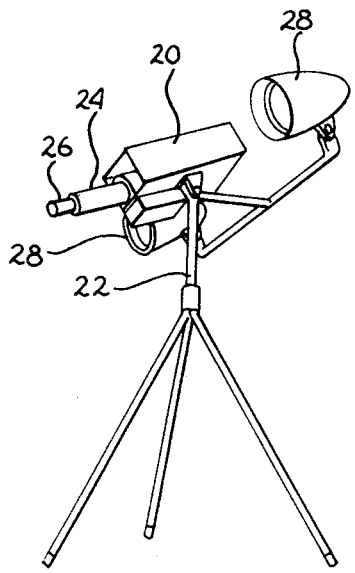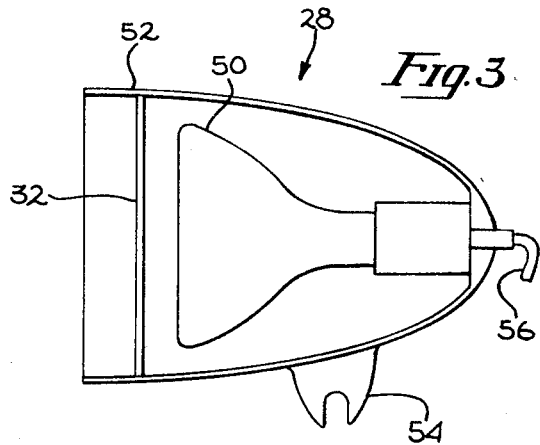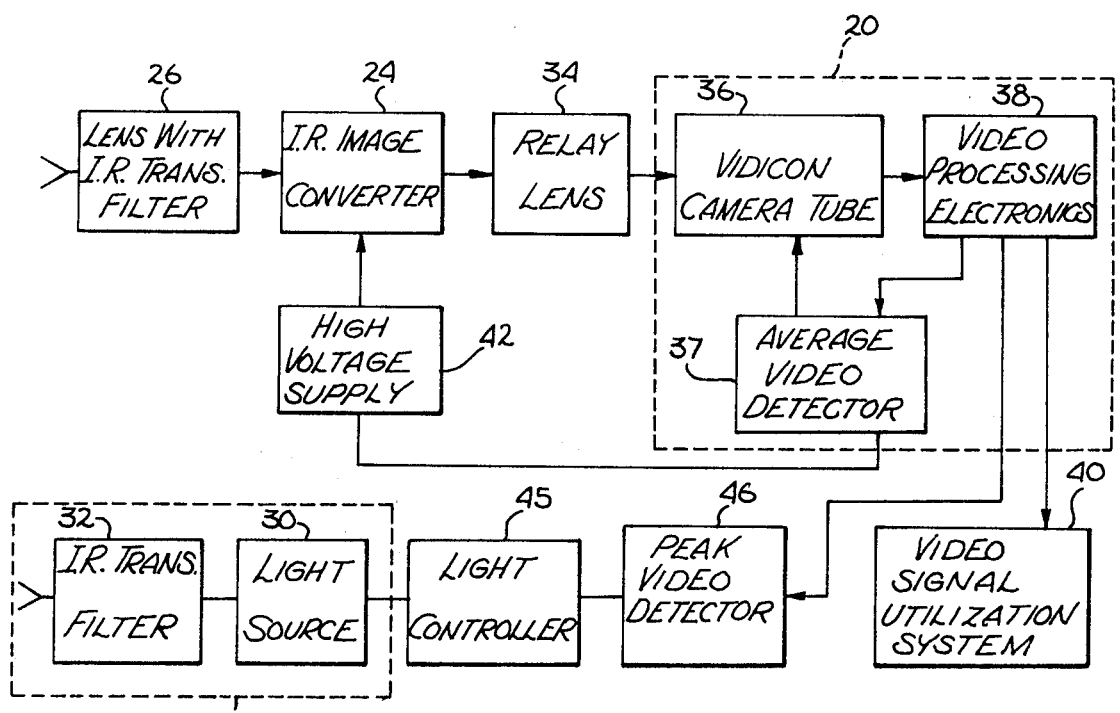

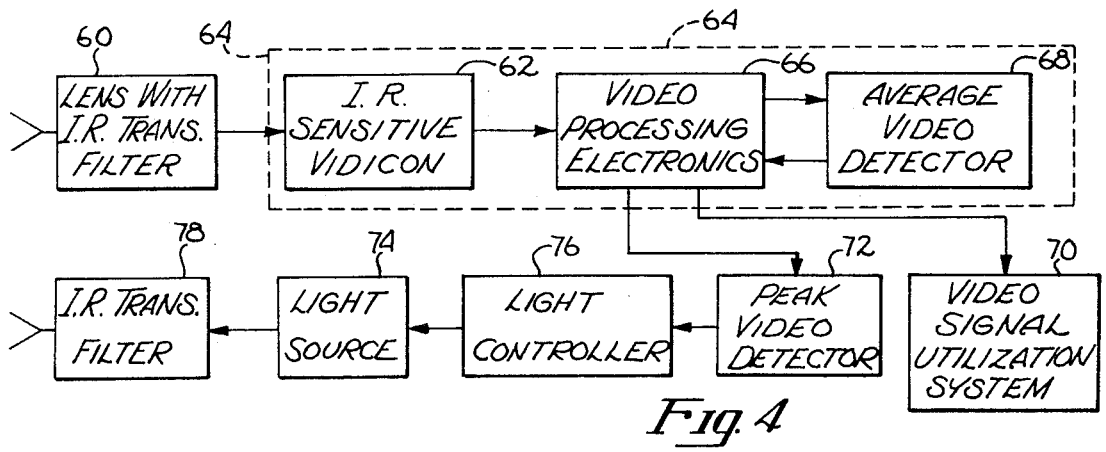
Fig. 4
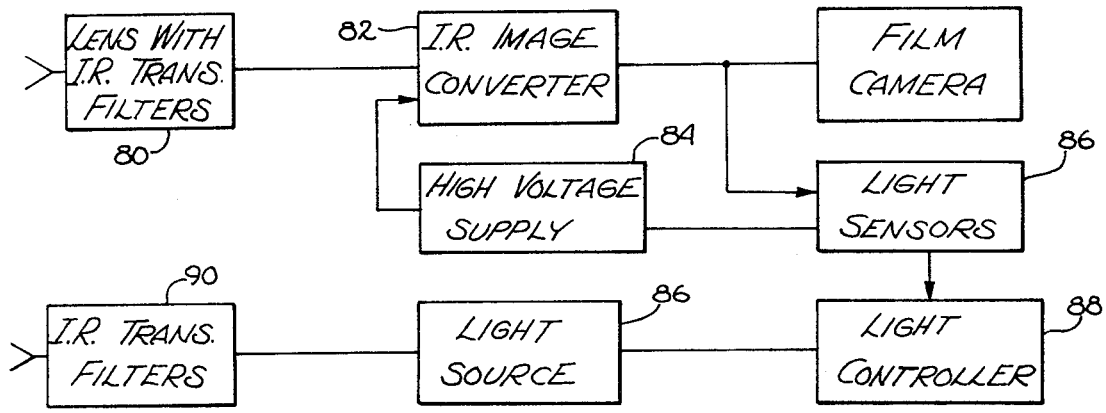
Fig. 5
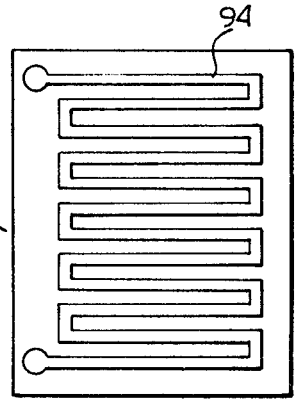
Fig. 6
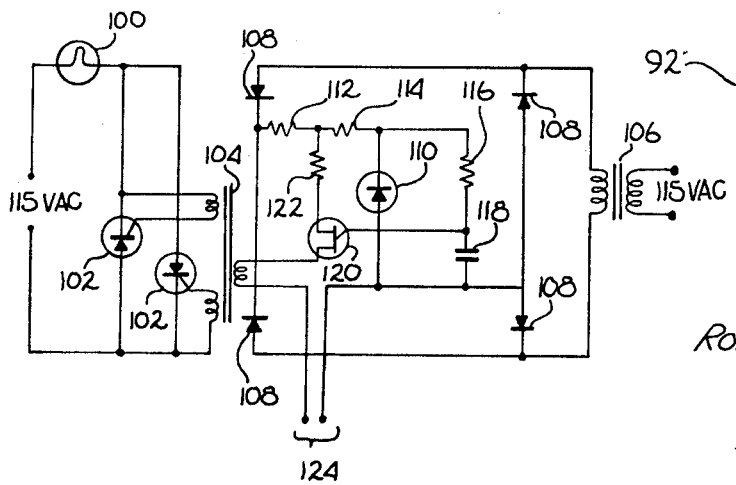
ROBERT GROSSMAN
INVENTOR.
BY
Hensley, Horn & Lubitz
ATTORNEYS

CAMERA SYSTEM FOR DAY AND NIGHT USE

BACKGROUND OF THE INVENTION

1. Field of the Invention

This invention relates to the field of camera systems for use under widely varying lighting conditions, and particularly to television camera systems for such use.

2. Prior Art

Various methods have been used to allow the use of cameras, such as film cameras and television cameras, under varied lighting conditions. For film cameras, such methods have included an adjustment of the shutter speed and of an iris opening, and the reinforcement of the natural lighting by artificial means, such as floodlights or flash bulbs, to maintain the light energy level incident to the film within a desired range. Television cameras do not have a shutter, and in some cameras, the primary adjustment to compensate for variation in lighting conditions is an automatic adjustment of the tube voltage, so as to vary the gain of the tube to offset the variations in the lighting. Therefore, for television cameras, the control normally used to assure proper intensity and contrast in the television picture is to provide sufficient artificial lighting so that the voltage control on the television tube may adequately control the intensity and contrast of the picture. In addition, or in lieu thereof, automatic gain control circuits are generally used in the video amplifiers. However, for the various reasons about to be described, these various methods of assuring a proper picture, whether using a film camera or a television camera, are compromises based on the capability of prior art equipment, and in many cases, are either difficult or impractical to use, or so affect the subject being photographed as to substantially diminish their value for such purposes.

The problem of building a camera suitable for use in lighting conditions ranging from direct sunlight to relatively low values of lighting is best illustrated by noting the range of illuminance commonly encountered under typical day and night lighting conditions. In direct sunlight, the illuminance may be as high as 100,000 lumens per square meter. The illuminance decreases by approximately an order of magnitude on an overcast day, and of course, is generally much less within a building. By way of example, an illuminance of 100 lumens per square meter is the minimum recommended luminance for close work under artificial light. Thus, the range in illuminance between a bright, sunny day and a reasonably well-lighted building is in the order of 1,000 to 1. The natural illuminance encountered at night may range from approximately 0.2 lumens per square meter in full moonlight down to $3 \times 10^{-4}$ lumens per square meter in starlight, and substantially less on a dark, overcast evening. Further, the lighting within an enclosed room having no artificial lighting therein, on a cloudy night, is extremely low, and for all practical purposes, is equivalent to total darkness.

A person may see very well in direct sunlight and may also see reasonably well under the lighting of starlight. Thus, the human eye functions reasonably well over a range of lighting conditions of approximately 300,000,000 to 1. However, cameras are generally incapable of operating over such wide ranges of lighting conditions, particularly if time exposures are not possible because of the use of a motion picture camera or because of motion of the subject. This may be illustrated by examining the range of adjustment achievable with the various prior art light intensity compensating methods.

The adjustment of shutter speed in film cameras which are being used to take still pictures may range from a small fraction of a second to a matter of hours or longer, and thus, variations in lighting may be offset by variations in time of the exposure of the film. However, if the subject being photographed is a moving subject, or if the camera itself may not be kept stationary with respect to the subject, then shutter speeds are normally limited to approximately one twenty-fifth of a second. Thus, assuming an upper limit of one one-thousandth of a second, variations in the shutter speed may compensate for lighting over a range of approximately 40 to 1. Also, the irises used on cameras normally have settings ranging from as low as $f1.5$ to as high as $f22$, and since the light incident upon the film is proportional to the square of the $f$ setting, the range of adjustment achievable with an iris is generally limited to approximately 215 to 1. Thus film cameras, when used to photograph a moving subject, are generally limited to illumination ranging over approximately 860 to 1, without using filters to limit the maximum exposure or artificial lighting to increase the minimum exposure to achieve the desired result. It is to be noted from the above stated figures that the lighting difference between a well-lighted building and direct sunlight may typically be as high as 1,000 to 1. Thus, it is clear that the mechanical adjustments on a film camera, such as a moving picture camera, are totally inadequate to allow the use of the camera under lighting conditions ranging from direct sun to anything that a person might consider to be inadequate lighting.

The primary controls on the intensity of the video signals obtained with a television camera are automatic gain controls determining the voltage on the camera tube, thereby affecting the intensity and characteristics of the electrical signal derived therefrom, and automatic gain control circuits in the amplifiers and signal conditioners operating on the video signal derived from the camera tube. However, the net effect of these gain control methods is limited to approximately 1,000 to 1 also, so that such television cameras are also generally limited to a rather narrow range of lighting conditions. Thus, both television cameras and film cameras are commonly used in conjunction with the floodlights or other artificial lighting means, so that the lighting is maintained within the range of capability of the camera being used.

Artificial lighting of two types has been used in the prior art. The most commonly used artificial lighting is artificial lighting within the visible spectrum, such as ordinary floodlights or flash bulbs. Such lighting is satisfactory or even desired in certain situations where the lighting may be beneficial for other purposes also. However, such lighting may be highly undesirable in other situations, such as in the photographing of activity within a darkened theater, or the photographing of various activities at night where the floodlights or flash bulbs may shine in the eyes of the persons being photographed so as to temporarily impair their vision or to distract them from what they were doing.

Any type of lighting which has been used to photograph subjects in a darkened environment is infrared lighting, which is invisible to the naked eye. Various light sources emit a high percentage of infrared light, and by using suitable filters in front of these light sources, the amount of visible light emitted therefrom may be reduced substantially to zero. However, in general, most television cameras and film cameras are relatively insensitive to infrared light, and therefore, the infrared light reflected from the subject being illuminated must first be converted to visible light before being transmitted to the film or camera tube. Image converter tubes suitable for this purpose are commercially available, and convert an infrared image focused on a photo cathode at one end of the tube to a visible image on a fluorescent screen at the other end of the tube by creation of an electron image at the photocathode which is then accelerated toward, and focused on the fluorescent screen. The visible image may then be photographed with a television camera or a film camera, thus allowing the photographing of darkened areas in an otherwise conventional manner by using the invisible infrared lighting. The intensity of the image on the fluorescent screen is dependent upon both the intensity of the infrared image focused on the photo cathode and the anode to cathode voltage in the tube. Therefore, in general, the image converter tubes also provide a method of compensating for changes in the intensity of the lighting on the subject, though the maximum range of control of this method is on the order of only 5 to 1. Prior art camera systems have used the above described image converter tubes to photograph subjects in a darkened environment without visibly changing the environment. These systems are comprised of a suitable image converter tube coupled to the camera, and further having sufficient infrared lighting, either natural or artificial, to adequately illuminate the subject so that a suitable picture is achieved. These systems, though not disturbing the visible environment, are limited by the fact that the infrared lighting must be carefully set up to uniformly illuminate the field of vision in a manner adequate for the requirements of the particular camera being used. Such systems are, in general, not mobile because of the stringent infrared lighting requirements and are not adequately self-compensating to photograph subjects having a substantial variations in natural infrared illumination. Consequently, such systems are, in general, limited in utility to applications allowing the set up and adjustment of a special infrared lighting system in accordance with the illumination requirements of the subject at that time.

BRIEF SUMMARY OF THE INVENTION

A camera system for day and night use whereby a picture of good quality and contrast may be obtained with lighting ranging from full sunlight to complete darkness without manual adjustment of the camera. In the preferred embodiment, the camera used may be a conventional television camera having a plumbicon or a standard vidicon tube which may have a gain control as part of the camera electronic system. A peak video detector senses the output of the video processing electronics, and through a controller, controls a light source having a substantial percentage emission of infrared light. The light source is placed to illuminate the field of view of the television camera system through an infrared transmitting filter, so as to form an infrared lighting system responsive to the peak video output of the television camera. The infrared light reflected within the field of view of the television camera system is focused by a lens having an infrared transmitting filter thereon to an infrared image converter. The image converter converts the infrared image incident thereon to a visual image which is coupled by a relay lens or by fiber-optics to the television camera tube. A feedback voltage responsive to the average video detector signal is used to control the voltage to the image converter tube, which in turn controls the visible light output of the image converter received by the television camera tube. In other embodiments, other cameras may be used, such as film cameras or television cameras having tubes which are directly responsive to infrared light.

BRIEF DESCRIPTION OF THE DRAWINGS

FIG. 1 is a perspective view of one embodiment of the camera system of the present invention;

FIG. 2 is a block diagram of the camera system of FIG. 1;

FIG. 3 is a cross section, on an expanded scale of one of the light sources of FIG. 1;

FIG. 4 is a block diagram of an alternate embodiment of the present invention;

FIG. 5 is a block diagram of a further alternate embodiment of the present invention using a film camera.

FIG. 6 is a front view of a photoconductive sensor for sensing the light incident upon the most poorly illuminated area of the sensor.

DETAILED DESCRIPTION OF THE INVENTION

The present invention is a camera system which may be used under lighting conditions ranging from direct sunlight to total darkness without manual adjustment thereof. For most applications, the camera system may be a portable system readily carried and operated by one man. In the preferred embodiment of the present invention, the camera system is used in conjunction with a television camera, as shown in FIG. 1. Television camera 20 is mounted on a tripod 22. Attached to the front of the camera, in the position normally occupied by a lens system, is an image converter 24 separated from the camera by a suitable relay lens or fiber-optics transmission member. On the front of the image converter 24 is a lens system 26 which is substantially the same as a lens normally used immediately in front of the camera tube in the television camera 20. Also attached to the camera is an infrared light source 28 which is adjusted to illuminate the field of view of the lens 26 with infrared radiation. The reflected infrared light is focused by lens 26 on the photo cathode of the image converter tube 24, and the visible image on the opposite end of the image converter tube is then optically transferred to the television camera 20.

A system as pictured in FIG. 1 weighs approximately 20 to 25 pounds, and is therefore readily moved from one position to another by one man, or hand carried by a man while operating the camera. Such a system generally is electrically attached to a source of electrical power and to a video recorder or transmitting device for recording or relaying the video signals. For applications requiring greater mobility, the operator may also carry a battery pack for operation of the camera and infrared lights, and might also carry a video recorder for complete mobility, though such a complete system using presently available commercial components is relatively heavy and might best be carried by two men.

Now referring to FIG. 2, a block diagram of the camera system of FIG. 1 may be seen. This system is used in conjunction with a camera having a camera tube such as a standard vidicon tube therein. In this system, a light source 30 illuminates, through an infrared transmitting filter 32, the field of view of the lens 26 on the infrared image converter 24 on the camera 20. The reflected infrared light is focused by this lens on the cathode of the infrared image converter 24, which reproduces a visible image at the anode of the converter. This image is relayed to the camera tube through a relay lens 34, or other suitable transmitting element. The video signal produced by the combination of camera tube 36 and video processing electronics 38 then goes to a video signal utilization system 40, which, depending on the specific application of the camera system, may be a closed circuit television monitor, a video recording system, or a television transmitting station.

As a first feedback signal in the block diagram of FIG. 2, the video processing electronics 38 determines a feedback voltage to be applied to the camera tube 36 so as to provide a first control on the video signal output as affected by variations in the image intensity. This control is primarily a contrast control, since changes in tube voltage primarily affect the contrast in the picture reproduced from the resulting video signal. Though some brightness is obtainable in this manner, the extent of brightness control obtainable by controlling the camera tube voltage is very limited compared to the ordinary variations in light intensity of the image. (In addition, the video amplifiers within the video processing electronics may have automatic gain control circuit to further control the video signal though this is not illustrated in FIG. 2). The use of such feedback is well known in the prior art.

The second feedback signal is derived from the video processing electronics 38 in the camera 20, and is used to control a high voltage supply 42 determining the anode to cathode voltage in the infrared image converter 24. This feedback signal determined by an average video detector 37, is proportional to the average video signal and therefore, is proportional to the average intensity of the image incident upon the camera tube, and is used to control the high voltage applied to the infrared image converter 24 so as to decrease the image converter voltage when the average video signal indicates an increase in the image intensity on the camera tube 36. This creates a first automatic compensation for variation in the reflected light intensity from the subject being viewed.

In general, the range of the compensation achievable by the above method is far less than the variation in lighting encountered in normal use, the therefore, a third signal is derived from the video processing electronics 38 and used to control the infrared light source 44 (comprised of light source 30 and infrared transmitting filter 32) illuminating the field of view of the camera system. This signal is derived from a peak video signal detector 46 and used to control, through light controller 45, the infrared light source 44. The peak video signal voltage is proportional to the light intensity at the darkest region of the visual image on the camera tube, and thus this third feedback signal provides a method of controlling the infrared illumination to the darkest areas or most poorly lighted areas of the subject within the field of view of the camera system (as shown on page 526 of Pulse and Digital Circuits by Millman and Taub, McGraw-Hill Book Co., Inc., 1956, a high level signal corresponds to the black level, while a low level signal corresponds to a white level). It is therefore apparent that by combining the three feedback control loops as in FIG. 2, automatic control of the brightness and the contrast of the video picture is achieved without manual adjustment of the camera system in any way, regardless of the natural lighting conditions on the subject.

Infrared image converters characteristically are also responsive to visible light, and in fact, may be more responsive to certain wave lengths of visible light than to infrared light. Consequently, in order to avoid wash-out of the video picture due to bright sources of visible light, such as headlights and reflections from shiny surfaces, an infrared transmitting filter is generally placed over the lens on the infrared image converter. Such a filter may be manually removable or may be automatically removed from the optical system upon the presence of adequate or nearly adequate natural lighting to operate the camera system. Thus, by way of example, portable systems can be used by the police or by reporters to shoot an accident scene without worrying about wash-out of the picture due to automobile headlights, street lights, etc.

Similarly, an infrared transmitting filter 32 is generally used over the light source 30 controlled by the peak video detector 46, so that the illumination controlled by the camera is a fairly pure infrared illumination. This, of course, is not specifically required for some applications, since simultaneous visible illumination of the field of view of the camera is not objectionable. However, in other instances, such lighting may interfere with the occurrence being recorded by disturbing the darkened environment or by shining directly into peoples' eyes. Therefore, the infrared transmitting filter over the light source controlled by the peak video detector is generally a permanent part of the light source.

The controller 45 used to control the light source in response to the peak video signal will depend on the particular light source used, and this, in turn, depends somewhat upon the intended use of the camera system and the availability of electrical power for operating the light source. One relatively inexpensive and fairly efficient source of infrared light is the standard incandescent light bulb. The light emitted from such a source is approximately 80 percent infrared light, and only about 20 percent of the light is in the visible range. Therefore, such sources have the advantage of using standard fixtures available at a relatively low cost, and further being readily available for replacement purposes. Furthermore, incandescent lights are readily controllable through relatively low voltage control circuits, do not require a high voltage triggering or starting signal, and tend to give a relatively constant rate of emission for a pulse input. This last advantage, however, is not a major advantage, since the persistence of the human eye and of the various fluorescent surfaces, such as the fluorescent screens in the image converter and in the television set receiving the video signal, substantially eliminate the effects of a pulsed light source.

If a standard 115 volt 60 cycle supply is available, the light source may be ordinary light bulbs or floodlights controlled by a silicon controlled rectifier controller adapted to be responsive to the peak video signal voltage. Such controllers are well known in the prior art, and provide a compact and efficient means of controlling incandescent lights. One disadvantage however, in using incandescent lights, is the fact that the primary control of the infrared emission is through the temperature control of the filament, which controls not only the infrared emission, but also the wavelength of the peak emission. Consequently, the infrared emission is nonlinearly dependent upon the bulb excitation voltage or power, through the infrared emission always increases with an increase in excitation voltage or power.

The light source 28 of FIG. 1 is shown in expanded cross section in FIG. 3. Incandescent floodlight 50 is housed in standard enclosure 52 (e.g., a commercially available enclosure for floodlights) having a mounting provision 54 and a power cord 56. The only significant modification of this assembly for use with the present invention is the addition of infrared transmitting filter 32, for substantially eliminating the radiation of visible light. For this purpose, visible light reflecting filters rather than absorbing filters are preferred, since this avoids excessive heating of the filter.

Other types of infrared light sources which may be used include xenon arc lamps and metallic ion lamps. The xenon arc emitter is particularly advantageous in applications where size and efficiency are prime considerations, since xenon is a highly compact and efficient radiator. However, such tubes require a high voltage pulse for starting, and therefore, are most conveniently used with a light controller providing an initial high voltage pulse followed by a minimum keep-alive current so as to maintain the arc at a low level, and to thereafter pulse the arc with a moderate voltage pulse to give a pulse output of infrared energy. The pulsing of the infrared light source, if done at a reasonable frequency, will not result in a visible flash in the television picture because of the persistence of the human eye and of the various fluorescent surfaces in the camera system as previously described.

Certain television camera tubes are not voltage controllable, and therefore, if such tubes are used with the camera in the system shown in FIG. 2, the first feedback signal from the video processing electronics to the camera tube will not be present. Thus, the contrast control achievable with the standard vidicon tube may not be obtained with these other tubes, such as a plumbicon and a tivicon tube. Though the automatic contrast control is a desirable feature, it is not necessary to the proper operation of the present invention, since substantially all areas of the field of view of the camera system are generally adequately and uniforming illuminated with the infrared light control system. Thus, the main advantage of the automatic contrast control is that picture wash-out or excessive contrast due to bright sources of infrared energy within the field of view of the camera system is substantially eliminated.

By illuminating the field of view of an area only slightly larger than the field of view from a point at or very near the camera system, shadows are substantially eliminated and the power required for adequate illumination is held to a minimum. By way of example, two 150 watt incandescent lights, operating through infrared transmitting filters, adequately illuminate an otherwise darkened room of 7500 square feet so that a high quality television picture is obtained. Of course, as the size of the field of view is increased, the power required in the infrared illumination is also increased. However, it should be noted that the directional characteristics of the infrared illumination resulting from the housing of the light source in a suitable reflector, and the illumination of a limited area (the camera field of view) the power required by the light source is only a small fraction of that that would be required to provide adequate distributed visible lighting. Thus, by way of example, sports events such as football and baseball games may be telecast with a high quality picture, even in the final twilight minutes of the game, from a field having no substantial visible artificial lighting without requiring a great deal of power and without distracting the players. Similarly, nighttime events such as auto races may be photographed or video recorded without distracting the participants.

There are at present becoming available infrared sensing vidicons with a silicon target material. These do not require an image converter since they generate video signals directly from the infrared image. However, the operation of a system using such camera tubes, as illustrated in FIG. 4, is basically the same as that shown in FIG. 2. In FIG. 4, a lens system with infrared transmitting filter 60 transmits an infrared image onto an infrared sensitive vidicon 62 in camera 64. The video processing electronics 66 in camera 64 characteristically has average video detector circuits 68 to provide gain control to the processing electronics for control of the video signal coupled to the video signal utilization system 70. As in the previous embodiment, a peak video detector 72 controls a light source 74 through a controller 76 so as to illuminate the field of view through infrared transmitting filter 78. Thus, the average video output level is maintained constant due to the average video detector 68 controlling the video processing electronics, and dark areas in the picture are minimized as before by the peak video detector 72, which maintains the infrared illumination by control of the illuminator output in response to the peak video signal.

Thus, a camera system has been described which will operate under all lighting conditions, from full sunlight to complete darkness. It will also operate satisfactorily when peak lighting conditions prevail against a dark background, due to such things as a street light or auto headlight at night, or reflected sunlight during the day. In order to operate under all lighting conditions without resorting to extremely sensitive camera tubes, use is made of infrared light for low light level conditions. However, the amplitude of infrared light is controllable by a peak video detector so that any dark areas are illuminated by the infrared illuminator. The average video signal is maintained at a constant level due to various average signal controls. By controlling both the peak and the average signals, the contrast and brightness are therefore both controlled.

To aid in the operation of the camera system under all lighting conditions, the voltage on the image converter tube in one embodiment is reduced when light levels are high, thus keeping the light level on the fluorescent screen in the image converter tube kept substantially constant to avoid problems of saturation (wash-out) on the image converter tube fluorescent screen.

The electronic circuits used in the systems of FIGS. 2 and 4 are circuits which may be readily designed and built by one skilled in the design of electronic circuits. Average video detectors, peak video detectors and light control circuits are well-known in the art, and the herein disclosed camera systems will function as desired with most of these well-known circuits. It should be noted that the degree of which the peak and the average video signals may be maintained constant will depend in part on the response of the particular control loop to a change in the control signal. By way of example, the infrared light source is controlled by the peak video detector, and thus, if the peak video signal is to be maintained within very narrow limits, the infrared light source must be controllable from a minimum or zero illumination to a maximum illumination by only a small change in the peak video signal. This means generally that the peak video signal must be compared with a reference signal, and the difference between these two signals amplified considerably prior to being coupled to the light controller. However, suitable circuits for the comparison of two voltages and the amplification of the difference therein, are well-known in the electronic art, and are therefore not described in detail herein. It should be noted also that in any closed loop system, there is a possibility of oscillation in the system, and particularly in systems having more than one loop therein. However, most elements in the loops of the diagrams of FIGS. 2 and 3 are very quickly responding elements, and any tendency of the system to oscillate as a result of using particular prior art circuits may be readily eliminated by incorporating suitable compensating circuits within the various amplifiers in the system.

A suitable light controller for light controllers 45, 76 and 88 shown in FIGS. 2, 4 and 5, respectively, is shown in FIG. 7. This controller is a modification of the regulated AC power supply described in detail starting on page 333 of the seventh edition of the General Electric Transistor Manual. The modification to the referenced circuit is to alter the control means from a potentiometer control to an electrical signal control. Light source 100 is connected to two silicon controlled rectifiers 102 and the combination is connected to a 115 volt 60 cycle power. The silicon controlled rectifiers 102 are fired by a pulse applied to transformer 104. Also connected to the 115 volt 60 cycle supply through transformer 106 is a trigger circuit for generating a pulse for triggering the silicon controlled rectifiers 102. The four diodes 108 provide full wave rectification of the AC signal applied to the trigger circuit, with zener diode 110 in combination with resistors 112 and 114 maintaining a constant voltage across the series combination of resistor 116 and capacitor 118. A unijunction transistor 120 is connected through resistor 122 to the connection between resistors 112 and 114, and is also connected through the primary of transformer 104 to one of the two terminals 124. The gate of the unijunction 120 is connected to the junction between capacitor 118 and resistor 116. Thus, when 60 cycle power is applied as shown, the applied voltage wave will go through zero 120 times a second, a silicon controlled rectifiers 102 will cease conducting at each such zero crossing. As the applied voltage increases in either direction from zero, the zener diode 110 quickly limits the voltage applied across resistor 116 and capacitor 118. Capacitor 118 is charged through resistor 116 until such time as the voltage applied to the gate of unijunction 120 is equal to the firing voltage for the unijunction transistor, at which time the unijunction fires and capacitor 118 is discharged through the unijunction and through the primary of transformer 104. This creates a pulse on the secondaries of transformer 104 which fires one of the silicon controlled rectifiers 102, thereby connecting light source 100 to the 115 volt supply. By controlling the voltage applied at terminals 124 in response to the signal generated by the light sensors, the point at which unijunction 120 will fire within any half cycle of the 115 volt supply voltage may be varied. Thus, the power received by light source 100 is controlled by phase control of the 115 volt 60 cycle power applied to the circuit by controlling the voltage applied to terminals 124. The above described circuit is here presented for purposes of example only, since circuits such as the circuit hereabove described may be readily designed by one skilled in the art, particularly with the aid of publications such as the one hereabove mentioned.

The camera systems heretofore described in detail relate to television camera systems, but the present invention is not to be so limited. By way of example, the camera used in the camera system, as shown in the block diagram of FIG. 5, may equally as well be a film camera. Since such cameras do not have an output signal in response to the intensity of the image, or various parts thereof, incident thereto, other devices must be used to sense the light intensity, and the control the image converter tube voltage and the infrared light source. In general, the image converter tube is controlled by an average intensity signal and sensors are commercially available which can be used to provide an output signal substantially dependent upon the average light intensity incident thereto. Thus, in FIG. 5, lens with infrared transmitting filter 80 focuses an infrared image on the infrared image converter 82, which in turn provides a visible image on the film camera 84. Light sensors 86 provide control signals to infrared image converter 82 through high voltage supply 84, and to the light source 86 through light controller 88 to illuminate the field of view through infrared transmitting filter 90.

For the control of the infrared light source a signal responsive to the average light intensity may be utilized, as is used for the image converter tube. However, as in the case of television camera systems, a better picture will generally result if a signal substantially dependent upon the light from the darkest area within the field of view of the camera is used to control the light source. Such sensors, though generally not commercially available, may be built in a number of ways. By way of example, the visible images from the infrared image converter 82 may be focused in a planar array of photovoltaic elements, and an "OR" gate used to couple the element having the lowest voltage output, to a comparison circuit, for comparing the output with the desired reference output. As an alternative, a photoresistive element 92 as shown in FIG. 6 may be used in place of the photovoltaic array. Such a device is characterized by a layer of photoconductive material 94 deposited in a pattern, or deposited and etched to form a pattern, on an insulative substrate 96 such as a ceramic substrate. The pattern of photoconductive material is characterized by a long and narrow photoconductive path substantially covering the surface of the substrate on which the image is focused (except for the small separation, for electrical reasons, between adjacent portions of the photoconductive path). The resistance of the photoconductive path is a measure of the light incident thereon. However, since photoconductors undergo great changes in resistance with changes in light intensity, and the resistance of a series combination of resistors (in this case a distributed resistance)

is dependent primarily on the largest resistors in the series combination (e.g., the darkest areas of the image) the resistance of the photoconductive path tends to be a measure of the light intensity in the darkest areas of the image. Thus, the sensor is substantially responsive to the light from the area of its field of view having the least light direction therefrom. Of course, such a sensor will not be greatly responsive to a very small dark area, but dark areas of any substantail size will cause an output substantially dependent on the intensity in the dark areas, independent of the intensity in the more adequately lighted areas.

The above described sensors should be arranged and chosen so as to be responsive to the same type of light as the camera receives and responds to. By way of example, in a camera system using an infrared image converter tube, the sensor may be adapted to receive a visual image from the image converter tube output through the use of a partially reflecting mirror within the optical system coupling the image of the converter tube to the camera.

It is to be uunderstood that though the invention has been particularly shown and described with reference to preferred embodiments thereof for use with television cameras and film cameras, it will be understood by those skilled in the art that various changes in form and details may be made therein without departing from the spirit and scope of the invention.

I claim:
1. A camera system comprised of:
a camera responsive to infrared light and having an optical system defining a field of view;
a source of infrared light,
a means responsive to infrared light;
a controlling means;
said source of infrared light being disposed with respect to said camera so as to illuminate said field of view from a position whereby infrared light reflected from within said field of view may be received by said camera;
said means responsive to infrared light being disposed with respect to said camera so as to sense infrared light coming from said field of view and providing a control signal to said controlling means in response thereto;
said controlling means being adapted to control the emission from said source of infrared light in response to said control signal applied thereto.
2. The camera system of claim 1 wherein:
said source of infrared light is comprised of an incandescent light, a reflector and an infrared transmitting filter;
said incandescent light and said reflector being cooperatively disposed so as to direct light toward said field of view;
said infrared transmitting filter being cooperatively disposed with respect to said incandescent light and said reflector so as to filter the output of said incandescent light directed toward said field of view.
3. The camera system of claim 1 wherein:
said camera optical system includes an infrared transmitting filter which prevents the transmission of a substantial amount of visible light; and
said means responsive to infrared light is substantially nonresponsive to visible light.

4. The camera system of claim 3 wherein said means responsive to infrared light is a means substantially responsive to the average intensity of infrared light incident thereto.
5. The camera system of claim 3 wherein said means responsive to infrared light is a means substantially responsive to the infrared light from the area of said field of view having the least infrared light directed therefrom to said last named means.
6. A camera system comprised of a camera responsive to visible light, an infrared image converter adapted to receive an infrared image input and provide a visible image output, an optical system defining a field of view, a source of infrared light, at least one means responsive to infrared light coming from said field of view, and an infrared light controlling means;
said optical system being coupled to said infrared image converter to provide an infrared image input thereto;
said output of said infrared image converter being optically coupled to said camera to transfer said visible image output thereto;
said source of infrared light being disposed with respect to said camera so as to illuminate said field of view from a position whereby infrared light reflected from within said field of view may be received by said camera;
said means responsive to infrared light providing a control signal to said infrared light controlling means in response to infrared light incident thereto;
said infrared light controlling means being adapted to control the emission from said source of infrared light in response to said control signal applied thereto.
7. The camera system of claim 6 further including an anode to cathode voltage controlling means, wherein:
said infrared image converter is an image converter tube having a photo cathode adjacent a first end thereof, and a fluorescent screen and anode adjacent a second end thereof, said visible image output for any infrared image input being controllable by the anode to cathode voltage applied thereto; and
said anode to cathode voltage controlling means is responsive to said means responsive to infrared light.
8. The camera system of claim 7 wherein:
said camera optical system includes an infrared transmitting filter which prevents the transmission of a substantial amount of visible light; and
said means responsive to infrared light is substantially nonresponsive to visible light.
9. The camera system of claim 7 wherein said means responsive to infrared light is a means substantially responsive to the average intensity of infrared light incident thereto.
10. The camera of claim 7 wherein said means responsive to infrared light is comprised of first and second responsive means;
said first responsive means providing a control signal to said infrared light controlling means; and
said second responsive means providing a control signal to said anode to cathode voltage controlling means.

11. The camera system of claim 10 wherein said first responsive means is a means substantially responsive to the infrared light from the area of its said field of view having the least infrared light directed therefrom to said last named means.

12. The camera system of claim 11 wherein said second responsive means is a means substantially responsive to the average intensity of infrared light incident thereto.

13. A camera system comprised of a television camera responsive to visible light, an infrared image converter adapted to receive an infrared input and provide a visible image output, an optical system defining a field of view, a source of infrared light illuminating said field of view so that infrared light reflected from within said field of view may be received by said optical system, an infrared light controlling means and at least one video detector coupled to the video signal of said television camera;

said optical system being coupled to said infrared image converter to provide an infrared image input thereto;

said output of said infrared image converter being optically coupled to said camera to transfer said visible image output thereto;

one of said video detectors providing a control signal to said infrared light controlling means in response to said video signal;

said infrared light controlling means being adapted to control the emission from said source of infrared light in response to said control signal applied thereto.

14. The camera system of claim 13 wherein said camera optical system includes an infrared transmitting filter which prevents the transmission of a substantial amount of visible light.

15. The camera system of claim 13 further comprising an anode to cathode voltage controlling means, wherein;

said infrared image converter is an image converter tube having a photo cathode adjacent a first end thereof, and a fluorescent screen and anode adjacent a second end thereof, said visible image output of any infrared image input being controllable by the anode to cathode voltage applied thereto; and said anode to cathode voltage controlling means is responsive to the signal from one of said video detectors.

16. The camera system of claim 15 wherein said infrared light controlling means is controlled by a first video detector, and said anode to cathode voltage is controlled by said second video detector.

17. The camera system of claim 16 wherein said first video detector is substantially a peak video detector.

18. The camera system of claim 17 wherein said second video detector is an average video detector.

19. The camera system of claim 18 wherein said infrared light controlling means is controlled by one of said video detectors substantially responsive to the peak of said video signal, said anode to cathode voltage is controlled by one of said video detectors substantially responsive to the average of said video signal, and said camera tube control voltage is controlled by one of said video detectors substantially responsive to the average of said video signal.

20. The camera system of claim 16 wherein said camera has a camera tube having a response which is controllable by means of a camera tube control voltage, and one of said video detectors is coupled to control said camera tube control voltage.

21. A camera system comprised of:

a television camera responsive to visible light;

an infrared image converter adapted to receive an infrared image input and provide a visible image output, the intensity of said visible image output in relation to said infrared image input being responsive to an anode to cathode image tube control voltage, said image tube being disposed with respect to said camera so as to present said visible image to said camera;

an optical system coupled to said infrared image converter having a field of view and presenting an infrared image input to said infrared image converter;

a controllable source of illumination adjacent said camera so as to illuminate said field of view, whereby illumination reflected from objects within the field of view may be received by said optical system;

an infrared transmissive filter coupled to said source of illumination to prevent the transmission of substantial visible light from said source of illumination into said field of view;

a video detection means responsive to the video signal in said television camera for providing first and second control signals;

a first controller responsive to said first control signal to control said source of illumination, and a second controller responsive to said second control signal to control said anode to cathode voltage of said infrared image converter.

22. The camera system of claim 21 further comprised of a second infrared transmissive filter, said second filter being disposed within said optical system to prevent the presentation of substantial amounts of visible light to said infrared image converter.

* * * * *